(12) United States Patent
Guerin

(10) Patent No.: US 7,585,920 B2
(45) Date of Patent: Sep. 8, 2009

(54) PROCESS FOR THE PREPARATION OF LOW MOLECULAR WEIGHT HYDROGENATED NITRILE RUBBER

(75) Inventor: Frederic Guerin, Port Arthur, TX (US)

(73) Assignee: Lanxess Inc., Sarnia, Ontario (CA)

( * ) Notice: Subject to any disclaimer, the term of this patent is extended or adjusted under 35 U.S.C. 154(b) by 0 days.

(21) Appl. No.: 10/589,763

(22) PCT Filed: Feb. 22, 2005

(86) PCT No.: PCT/CA2005/000255

§ 371 (c)(1),
(2), (4) Date: Apr. 3, 2008

(87) PCT Pub. No.: WO2005/080456

PCT Pub. Date: Sep. 1, 2005

(65) Prior Publication Data

US 2008/0214741 A1    Sep. 4, 2008

(30) Foreign Application Priority Data

Feb. 23, 2004    (CA)    .................................. 2462005

(51) Int. Cl.
C08F 20/42    (2006.01)
C08F 236/12    (2006.01)
C08C 19/02    (2006.01)
C08C 19/00    (2006.01)
C08L 35/04    (2006.01)

(52) U.S. Cl. .............. 525/329.1; 525/329.2; 525/329.3; 525/338; 525/340; 525/370

(58) Field of Classification Search ............. 525/329.1, 525/329.2, 329.3, 338, 340, 370
See application file for complete search history.

(56) References Cited

U.S. PATENT DOCUMENTS 7,381,781 B2 * 6/2008 Ong et al. .................... 526/171
2004/0132906 A1 * 7/2004 Guerin et al. .................. 525/63

FOREIGN PATENT DOCUMENTS

CA    2350280    12/2002

OTHER PUBLICATIONS

Schmidt, B. et al "Tandem olefin metathesis/hydrogenation at ambient temperature: activation of ruthenium carbene complexes by addition of hydrides" Org. Biomol. Chem. 1(14), 2512-2517 (2003), abstract, figure 1—catalyst.
Grubbs, R.H. et al: "Synthesis and Activity of Ruthenium Alkylidene Complexes Coordinated with Phosphine and N-Heterocyclic Carbene Ligands" J. Am. Chem. Soc. vol. 125, No. 9, 2546-2558 (2003) abstract compound 2.

* cited by examiner

Primary Examiner—Roberto Rábago
(74) Attorney, Agent, or Firm—Jennifer R. Seng

(57) ABSTRACT

The present invention relates to a process for the production of hydrogenated nitrile rubber polymers having lower molecular weights and narrower molecular weight distributions than those known in the art in the characterized that the process is carried out in the presence of hydrogen and optionally at least one co-(olefin).

5 Claims, No Drawings

US 7,585,920 B2

PROCESS FOR THE PREPARATION OF LOW MOLECULAR WEIGHT HYDROGENATED NITRILE RUBBER

FIELD OF THE INVENTION

The present invention relates to a process for the production of hydrogenated nitrile rubber polymers having lower molecular weights and narrower molecular weight distributions than those known in the art in the characterized that the process is carried out in the presence of hydrogen and optionally at least one co-(olefin).

BACKGROUND OF THE INVENTION

Hydrogenated nitrile rubber (HNBR), prepared by the selective hydrogenation of acrylonitrile-butadiene rubber (nitrile rubber; NBR, a co-polymer comprising at least one conjugated diene, at least one unsaturated nitrile and optionally further co-monomers), is a specialty rubber which has very good heat resistance, excellent ozone and chemical resistance, and excellent oil resistance. Coupled with the high level of mechanical properties of the rubber (in particular the high resistance to abrasion) it is not surprising that HNBR has found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 55 to 105, a molecular weight in the range of from 200,000 to 500,000 g/mol, a polydispersity greater than 3.0 and a residual double bond (RDB) content in the range of from 1 to 18% (by IR spectroscopy).

One limitation in processing HNBR is the relatively high Mooney Viscosity. In principle, HNBR having a lower molecular weight and lower Mooney viscosity would have better processability. Attempts have been made to reduce the molecular weight of the polymer by mastication (mechanical breakdown) and by chemical means (for example, using strong acid), but such methods have the disadvantages that they result in the introduction of functional groups (such as carboxylic acid and ester groups) into the polymer, and the altering of the microstructure of the polymer. This results in disadvantageous changes in the properties of the polymer. In addition, these types of approaches, by their very nature, produce polymers having a broad molecular weight distribution.

A hydrogenated nitrile rubber having a low Mooney (<55) and improved processability, but which has the same microstructure as those rubbers which are currently available, is difficult to manufacture using current technologies. The hydrogenation of NBR to produce HNBR results in an increase in the Mooney viscosity of the raw polymer. This Mooney Increase Ratio (MIR) is generally around 2, depending upon the polymer grade, hydrogenation level and nature of the feedstock. Furthermore, limitations associated with the production of NBR itself dictate the low viscosity range for the HNBR feedstock. Currently, one of the lowest Mooney viscosity products available is Therban® VP KA 8837 (available from Bayer), which has a Mooney viscosity of 55 (ML 1+4 @ 100° C.) and a RDB of 18%.

Co-pending applications PCT/CA02/00967, PCT/CA02/00966 and PCT/CA02/00965 disclose a process for the preparation of a, optionally hydrogenated, nitrile rubber comprising reacting a nitrile rubber in the presence of at least one co-olefin. Said co-pending applications disclose that the same catalyst may be used in the hydrogenation and the metathesis reaction. The present invention, however, discloses that the metathesis reaction may be conducted in the presence of hydrogen.

SUMMARY OF THE INVENTION

We have now discovered that hydrogenated nitrile rubber having lower molecular weights and narrower molecular weight distributions than those known in the art can be prepared by the metathesis of nitrile butadiene rubber in the presence of hydrogen and, optionally at least one co-(olefin). Thus, the inventive process is capable of producing a hydrogenated nitrile rubber having a molecular weight ($M_w$) in the range of from 20,000 to 250,000, a Mooney viscosity (ML 1+4 @ 100 deg. C.) of in the range of from 1 to 50, and a MWD (or polydispersity index) of less than 2.6 in a single step.

DESCRIPTION OF THE INVENTION

As used throughout this specification, the term "nitrile polymer" is intended to have a broad meaning and is meant to encompass a copolymer having repeating units derived from at least one conjugated diene, at least one alpha-beta-unsaturated nitrile and optionally further one or more co-polymerizable monomers.

The conjugated diene may be any known conjugated diene, in particular a $C_4$-$C_6$ conjugated diene. Preferred conjugated dienes are butadiene, isoprene, piperylene, 2,3-dimethyl butadiene and mixtures thereof. Even more preferred $C_4$-$C_6$ conjugated dienes are butadiene, isoprene and mixtures thereof. The most preferred $C_4$-$C_6$ conjugated diene is butadiene.

The unsaturated alpha-beta-unsaturated nitrile may be any known alpha-beta-unsaturated nitrile, in particular a $C_3$-$C_5$ alpha-beta-unsaturated nitrile. Preferred $C_3$-$C_5$ alpha-beta-unsaturated nitrites are acrylonitrile, methacrylonitrile, ethacrylonitrile and mixtures thereof. The most preferred $C_3$-$C_5$ α,β-unsaturated nitrile is acrylonitrile.

Preferably, the copolymer comprises in the range of from 40 to 85 weight percent of repeating units derived from one or more conjugated dienes and in the range of from 15 to 60 weight percent of repeating units derived from one or more unsaturated nitrites. More preferably, the copolymer comprises in the range of from 60 to 75 weight percent of repeating units derived from one or more conjugated dienes and in the range of from 25 to 40 weight percent of repeating units derived from one or more unsaturated nitrites. Most preferably, the copolymer comprises in the range of from 60 to 70 weight percent of repeating units derived from one or more conjugated dienes and in the range of from 30 to 40 weight percent of repeating units derived from one or more unsaturated nitrites.

Optionally, the copolymer may further comprise repeating units derived from one or more co-polymerizable monomers, such as unsaturated carboxylic acids. Non-limiting examples of suitable unsaturated carboxylic acids are fumaric acid, maleic acid, acrylic acid, methacrylic acid and mixtures thereof. Repeating units derived from one or more co-polymerizable monomers will replace either the nitrile or the diene portion of the nitrile rubber and it will be apparent to the skilled in the art that the above mentioned figures will have to be adjusted to result in 100 weight percent. In case of the mentioned unsaturated carboxylic acids, the nitrile rubber preferably comprises repeating units derived from one or more unsaturated carboxylic acids in the range of from 1 to 10 weight percent of the rubber, with this amount displacing a corresponding amount of the conjugated diolefin. The presence of these co-monomers seems to enhance the metathesis reaction and allows conducting said reaction at temperatures in the range of from 0-50° C.

Other preferred optionally further monomers are unsaturated mono- or di-carboxylic acids or derivatives thereof (e.g., esters, amides and the like) including mixtures thereof.

According to the invention the substrate is simultaneously subject to a metathesis reaction and a hydrogenation reaction.

The inventive process is conducted in the presence of one or more compounds of the general formula I,

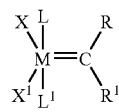

Formula I wherein

M is Os or Ru,

R and $R^1$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl, X and $X^1$ are independently any anionic ligand, L is any neutral ligand, such as phosphines, amines, thioethers, L' is an imidazolidinylidene or imidazolidine or any neutral carbine, optionally, L and $L^1$ can be linked to one another to from a bidentate neutral ligand;

Compounds of Formula I known as $2^{nd}$ generation Grubb's catalysts, such as 1,3-bis-(2,4,6-trimethylphenyl)-2-imidazolidinylidene)-(tricyclohexylphosphine)ruthenium(phenylmethylene) dichloride are preferred.

The amount of catalytic compounds will depend upon the nature and catalytic activity of the compound(s) in question. Typically, the ratio of compound(s) to NBR is in the range of from 0.005 to 5, preferably in the range of from 0.025 to 1 and, more preferably, in the range of from 0.1 to 0.5.

The process can be carried out in any suitable solvent which does not inactivate the catalyst or otherwise interfere with the reaction. Preferred solvents include, but are not limited to, dichloromethane, benzene, toluene, tetrahydrofuran, methyl ethyl ketone, cylcohexane and the like. The most preferred solvent is monochlorobenzene (MCB).

The concentration of NBR in the reaction mixture is not critical but, obviously, should be such that the reaction is not hampered if the mixture is too viscous to be stirred efficiently, for example. Preferably, the concentration of NBR is in the range of from 1 to 40% by weight, most preferably in the range of from 6 to 15 wt. %.

The concentration of hydrogen is usually between 500 psi and 2000 psi, preferably 1000 psi and 1400 psi.

The process is preferably carried out at a temperature in the range of from 0 to 140° C.; preferably in the range of from 20 to 100° C.

The reaction time will depend upon a number of factors, including cement concentration, amount of catalyst used and the temperature at which the reaction is performed. The progress of the reaction may be monitored by standard analytical techniques, for example using GPC or solution viscosity. Whenever referenced throughout the specification the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

Hydrogenation in this invention is understood by preferably more than 50% of the residual double bonds (RDB) present in the starting nitrile polymer being hydrogenated, preferably more than 90% of the RDB are hydrogenated, more preferably more than 95% of the RDB are hydrogenated and most preferably more than 99% of the RDB are hydrogenated.

The Mooney viscosity of the rubber can be determined using ASTM test D1646.

Due to the low viscosity of the resulting HNBR, it is ideally suited to be processed by but not limited to molding injection technology. The polymer can also be useful to transfer molding, to compression molding, or to liquid injection molding.

Further, the inventive polymer is very well suited for the manufacture of a shaped article, such as a seal, hose, bearing pad, stator, well head seal, valve plate, cable sheathing, wheel, roller, pipe seal, in place gaskets or footwear component prepared by injection molding technology.

EXAMPLES

Examples 1-2

Tris(triphenylphosphine)Rhodium Chloride (Wilkinson's hydrogenation catalyst), 1,3-bis-(2,4,6-trimethylphenyl)-2-imidazolidinylidene) (tricyclohexylphosphine)-Ruthenium (phenylmethylene) dichloride (Grubbs $2^{nd}$ generation metathesis catalyst). Triphenylphosphine (TPP) and monochlorobenzene (MCB) were purchased from JMI, Materia Inc., Elf Atochem and PPG respectively and used as received.

The reactions were carried out in a 2 US gallon high pressure Parr Reactor under the following conditions:

| | |
|---|---|
| Cement Concentration | 12 wt. % |
| Catalyst Type and Loading | see Table 1 |
| Solvent | Monochlorobenzene |
| Substrate | Statistical Butadiene-acrylonitrile copolymer with a acrylonitrile content of 34 wt % and a Mooney-Viscosity ML (1 + 4) @ 100 deg. C. of 29 units. |
| $H_2(g)$ pressure | 1200 psi |
| Agitator Speed | 600 rpm |
| Reactor Temperature | 138° C. |

The cement was degassed 3 times with $H_2$ (100 psi) under full agitation. The temperature of the reactor was raised to 130° C. and a 60 mL monochlorobenzene solution containing the catalyst and triphenylphosphine (if needed) was added to the reactor. The temperature was allowed to increase to 138° C. and maintained constant for the duration of the reaction.

The hydrogenation reaction was monitored by measuring the residual double bond (RDB) level at various intervals using IR spectroscopy.

Example 1-2

Details

TABLE 1

Comparison of Hydrogenation Profiles

| | Example 1 | | Example 2 (Comparative) | |
|---|---|---|---|---|
| Catalyst | | | | |
| | Grubb's 2nd Generation | | Wilkinson's | |
| Catalyst loading | | | | |
| | 0.07 phr | | 0.07 phr | |
| Co-Catalyst | | | | |
| | None | | TPP, 1 phr | |
| Time | RDB (%) | In (RDB) | RDB (%) | In (RDB) |
| 0 | 100 | 4.60 | 100 | 4.60 |
| 30 | | | 36.6 | 3.60 |
| 60 | 19.5 | 2.97 | 23.0 | 3.13 |
| 120 | 8.3 | 2.11 | 10.3 | 2.33 |
| 180 | 2 | 0.69 | 5.5 | 1.70 |
| 240 | 1.2 | 0.18 | 3.2 | 1.16 |

TABLE 2

Summary of HNBR Properties

| | Mn | Mw | PDI |
|---|---|---|---|
| Example 1 | 66000 | 178000 | 2.70 |
| Example 2 | 97000 | 314000 | 3.24 |

Examples 3-4

Compounding and Physical Testing in Peroxide Recipe

Polymer composites were mixed on an open mill. The curatives were added on a cold open mill in a separate mixing step. The formulations used in this assessment are based on a simplified peroxide recipe.

Carbon black N 660 Sterling-V available from Cabot Tire Blacks

Maglite® D is a MgO available from C. P. Hall.

Naugard® 445 is a diphenylamine available from Uniroyal Chemical.

Plasthall TOTM is a Trioctyl trimellitate available from C. P. Hall.

Vulkanox® ZMB-2/C5 is a Zinc salt of 4- and 5-methyl-mercapto benzimidazole available from Bayer AG DIAK #7 is a Triallylisocyanurate available from DuPont Dow Elastomers Vulcup 40KE is 2,2'-bis(tert-butylperoxy di-isopropylbenzene) available from Harwick Standard.

TABLE 3

Peroxide Cure Compounding Recipe

| | Example 3 | Example 4 (Comp.) |
|---|---|---|
| Polymer of Example 1 | 100 | |
| THERBAN A 3406 | | 100 |
| CARBON BLACK, N 660 STERLING-V | 50 | 50 |
| MAGLITE D | 3 | 3 |
| NAUGARD 445 | 1 | 1 |
| PLASTHALL TOTM | 5 | 5 |
| VULKANOX ZMB-2/C5 (ZMMBI) | 0.4 | 0.4 |
| ZINC OXIDE (KADOX 920) GRADE PC 216 | 3 | 3 |
| DIAK #7 | 2 | 2 |
| VULCUP 40KE | 7 | 7 |

Polymer Composites Properties

Table 4 shows a summary of the properties of polymer composites of Exp. 3 and 4. Example 4 is for comparison. The MDR cure characteristics were at 1.7 Hz, 1° arc, 180° C., 30 min, 100 dNm.

TABLE 4

Summary of Polymer Composite Properties

| | Ex. 3 | Ex. 4 (Comp) |
|---|---|---|
| MOONEY VISCOSITY (ML1 + 4/100° C.) | | |
| Raw Polymer | 41.5 | 63.6 |
| COMPOUND MOONEY VISCOSITY (ML1 + 4/100° C.) | | |
| Compound | 58.6 | 77.4 |
| MH (dN · m) | 39.8 | 46.4 |
| ML (dN · m) | 1.5 | 2.2 |
| Delta MH – ML (dN · m) | 38.3 | 44.2 |
| Modulus @ 100 (MPa) | 4.8 | 6.3 |
| Ultimate Tensile (MPa) | 20.74 | 22.23 |
| Ultimate Elongation (%) | 254 | 247 |
| Hardness Shore A2 (pts.) | 61 | 63 |

From Table 4, it is clear that although the molecular weight (Mw) of the Low Mooney HNBR used in polymer composite 3 is only 66% of that of Therban® A3406, the physical properties remain very good.

The invention claimed is:

1. A process for the preparation of a hydrogenated nitrile rubber comprising reacting a nitrile rubber in the presence of hydrogen, optionally at least one co-olefin, and in the presence of at least one compound selected from the group consisting of compounds of the general formula I,

Formula I wherein

M is Os or Ru,

R and $R^1$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl, X and $X^1$ are independently any anionic ligand, L is any neutral ligand L' is selected from any 1-3 disubstituted imidazolidinylidene or 1,3 disubstituted imidazolidine ligand, wherein a metathesis reaction and a hydrogenation reaction occur simultaneously.

2. A process according to claim 1 wherein the process occurs in the absence of any co-olefin.

3. A process according to claim 1 wherein L is a trialkylphosphine and $L^1$ is an imidazolidinylidene, X and $X^1$ are chloride ions and M is ruthenium.

4. A process according to claim 1 wherein the ratio of compound to nitrile rubber is in the range of from 0.005 to 5.

5. A process according to claim 1 wherein the process is carried out in an inert solvent selected from the group consisting of monochlorobenzene, dichloromethane, benzene, toluene, tetrahydrofuran and cyclohexane.

* * * * *